United States Patent [19]

Mori et al.

[11] Patent Number: 4,698,629
[45] Date of Patent: Oct. 6, 1987

[54] METHOD AND APPARATUS FOR COORDINATION AMONG DISTRIBUTED SUBSYSTEMS

[75] Inventors: Kinji Mori, Yokohama; Shoji Miyamoto, Kawasaki; Hirokazu Ihara, Machida, all of Japan

[73] Assignee: Hitachi, Ltd., Tokyo, Japan

[21] Appl. No.: 544,137

[22] Filed: Oct. 21, 1983

[30] Foreign Application Priority Data

Oct. 22, 1982 [JP] Japan .................................. 57-18455

[51] Int. Cl.⁴ ...................... G05B 19/42; G06F 15/46
[52] U.S. Cl. .............................. 340/825.05; 364/474; 340/825.23
[58] Field of Search ....................... 340/825.22, 825.23, 340/825.06, 825.05; 364/474, 468; 318/562, 569; 29/563, 564, 33 P; 235/375

[56] References Cited

U.S. PATENT DOCUMENTS

| 4,100,597 | 7/1978 | Fleming et al. | 318/562 |
| 4,309,600 | 1/1982 | Perry et al. | 235/375 |
| 4,473,883 | 9/1984 | Yoshida et al. | 364/474 |
| 4,503,507 | 3/1985 | Takeda et al. | 318/568 |
| 4,517,644 | 5/1985 | Hamada et al. | 340/825.05 |

FOREIGN PATENT DOCUMENTS

| 2070744 | 9/1971 | France | |
| 54-149008 | 11/1979 | Japan | 29/563 |

OTHER PUBLICATIONS

U.K. patent application, GB2068148.A, 08-05-1981, Clark et al.

Primary Examiner—Donald J. Yusko
Attorney, Agent, or Firm—Antonelli, Terry & Wands

[57] ABSTRACT

A plurality of subsystems are connected in common to a single information transmission loop through associated subsystem controllers, coordinators and information transmission controllers respectively, so that works allotted to be executed by the individual subsystems are executed while keeping coordination among the distributed subsystems under control of the coordinators.

6 Claims, 14 Drawing Figures

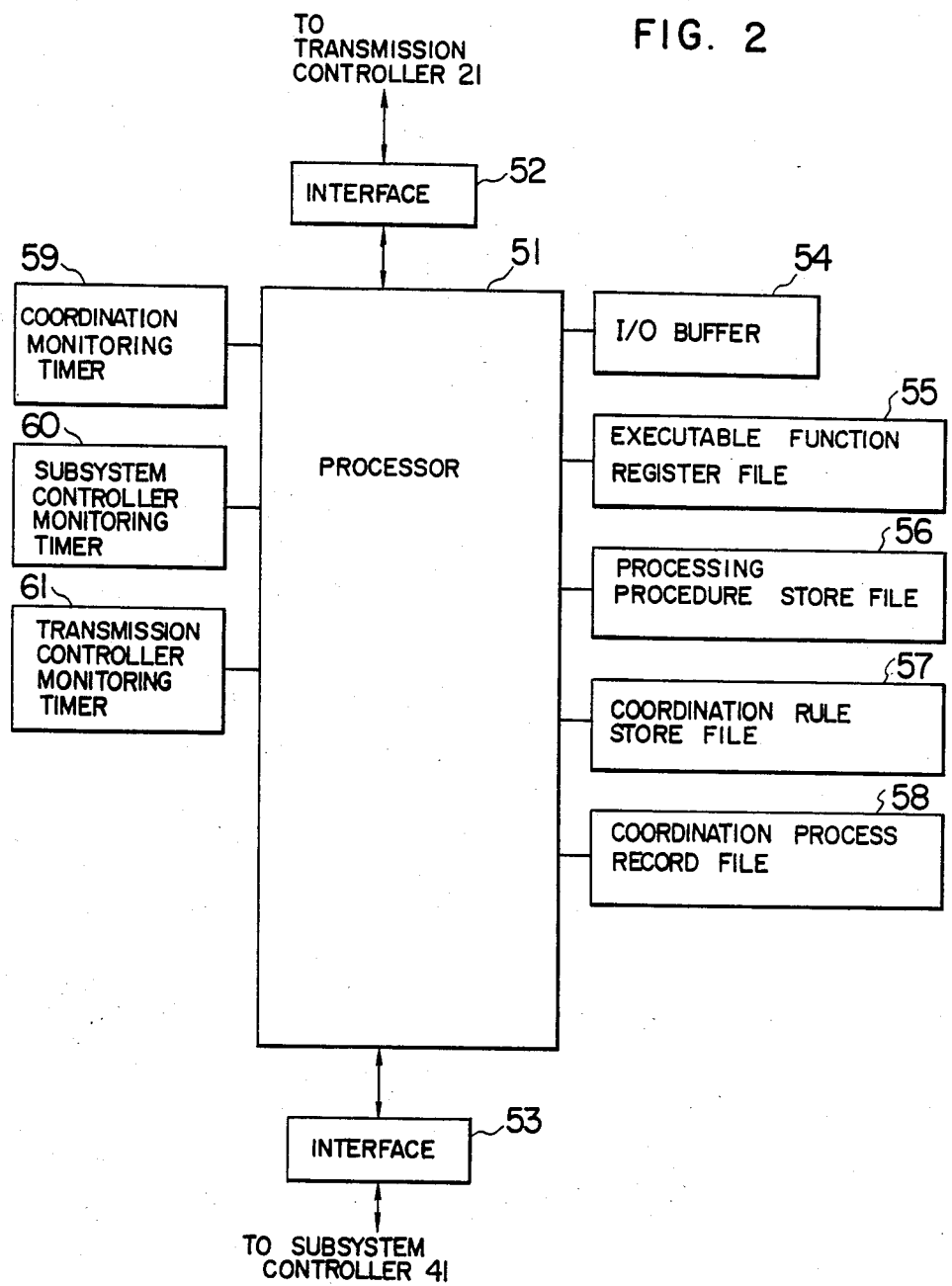

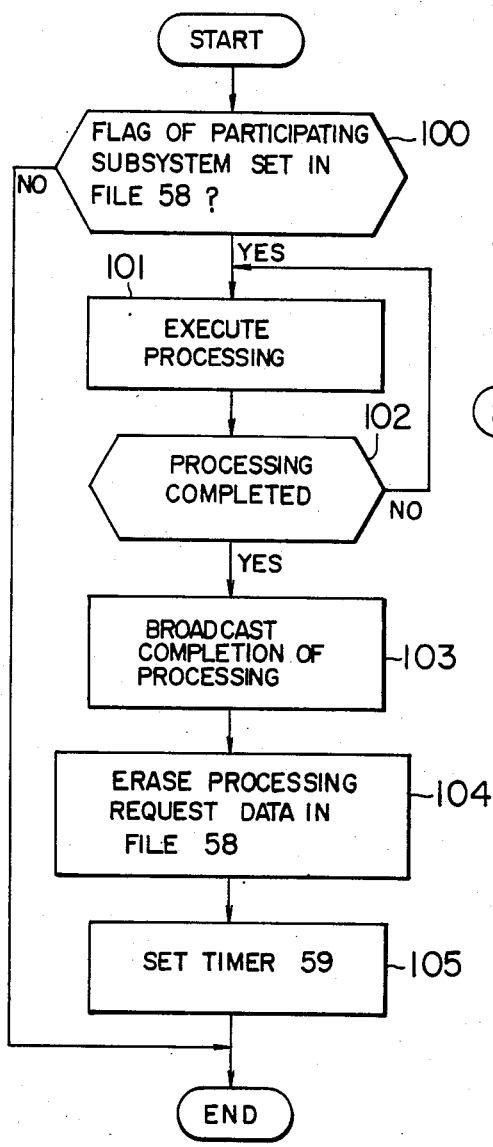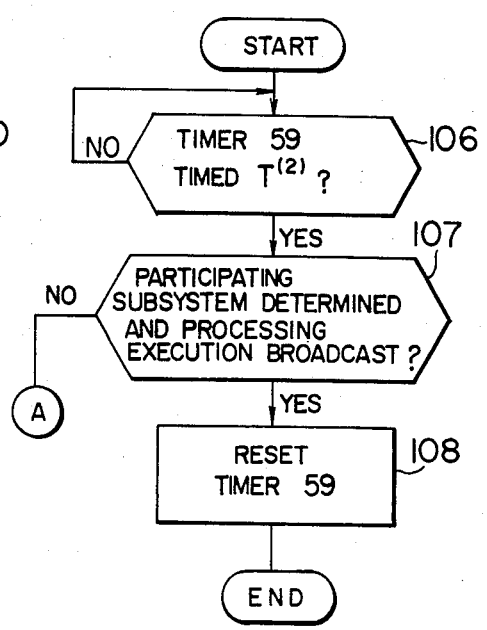
FIG. 3e
FIG. 3f

| SUBSYSTEM | EXECUTABLE FUNCTION REGISTER FILE |
|---|---|
| 1, 2 | $F_1, F_4$ |
| 3 | $F_2, F_7$ |
| 4 | $F_3, F_9$ |
| 5 | $F_5, F_6, F_8$ |

FIG. 7

| SUBSYSTEM | WORK-PIECE | FORWARD PROCESS | PRESENT PROCESS | BACKWARD PROCESS |
|---|---|---|---|---|
| 1,2 | $P_1$ | — | $F_1$ | $F_2$ |
| | | | | $F_3$ |
| | $P_1$ | $F_2$ | $F_4$ | $F_5$ |
| | $P_1$ | $F_3$ | | |

| | | | | |
|---|---|---|---|---|
| 3 | $P_1$ | $F_1$ | $F_2$ | $F_4$ |
| | $P_2$ | $F_6$ | $F_7$ | $F_8$ |

| | | | | |
|---|---|---|---|---|
| 4 | $P_1$ | $F_1$ | $F_3$ | $F_4$ |
| | $P_1$ | $F_5$ | $F_9$ | — |
| | $P_2$ | $F_8$ | | |

| | | | | |
|---|---|---|---|---|
| 5 | $P_1$ | $F_4$ | $F_5$ | $F_9$ |
| | $P_2$ | — | $F_6$ | $F_7$ |
| | $P_2$ | $F_7$ | $F_8$ | $F_9$ |

METHOD AND APPARATUS FOR COORDINATION AMONG DISTRIBUTED SUBSYSTEMS

This invention relates to a method and apparatus for use in a system including a plurality of distributed subsystems carrying out the same or different functions, the apparatus being connected to the individual subsystems so that the subsystems can execute a series of processing operations while keeping coordination among them.

In a system including a plurality of distributed subsystems, those which should participate in the processing and the order of operations to be processed by each individual subsystem have been determined by a central unit. Such a centralized system has been defective in that operational failure of the central unit leads necessarily to shutdown of the whole system. The prior art centralized system has also been defective in that a vast amount of information must be collected or stored in a single unit in order to readily grasp the status of each individual subsystem. The prior art centralized system has further been defective in that a modification of the central unit is required to deal with provision of an additional subsystem or subsystems and alteration of the function of the existing subsystem or subsystems, and, for that purpose, the operation of the whole system must be stopped.

It is therefore a primary object of the present invention to provide a method and apparatus for coordination among a plurality of distributed subsystems, in which each individual subsystem selects an executable one from among a series of operations, associated ones of the subsystems cooperate with each other to select the one subsystem deemed to be most suitable for processing depending on the situation, and the order of works to be executed by each individual subsystem is determined upon consideration of the relation between it and the other subsystems.

The present invention which attains the above object is featured by the fact that each individual subsystem judges its own status and functions and coordinates to determine the operations to be executed by itself. More concretely, according to the present invention, an operation which is executable by each individual subsystem in a process and operations which are executable in processes before the after or forward and backward of that process are extracted from among a series of operations, and, in order that the work in the succeeding process can be immediately executed after execution of the work in the preceding process on the basis of the result of work extraction, the executable ones of the subsystems coordinate with each other to select the one which should participitate in the execution of the operations, and the order of the operations to be executed is determined in each individual subsystem.

The present invention will be apparent from the following detailed description taken in conjunction with the accompanying drawings, in which:

FIG. 2 is a block diagram showing the structure of a preferred form of the coordinator employed in the system according to the present invention;

FIGS. 3a to 3g are flow charts of the steps of processing by the processor incorporated in the coordinator shown in FIG. 2; and FIGS. 4 to 7 illustrate the operation of the coordinator shown in FIG. 2.

Figure 1A:
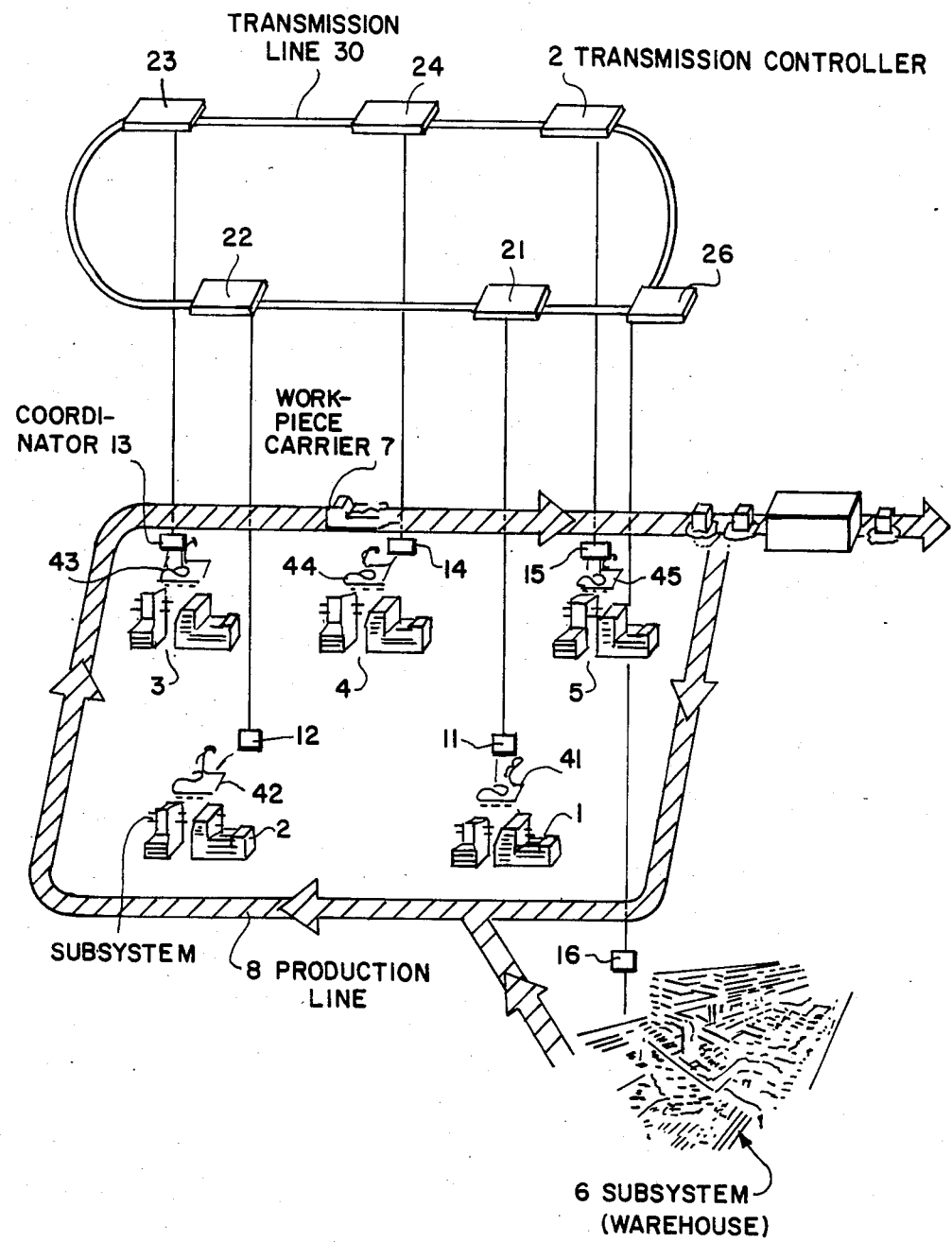
FIG. 1A is a schematic diagram showing the structure of a preferred embodiment of the system according to the present invention.

FIG. 1A shows the structure of a preferred embodiment of the system according to the present invention. Referring to FIG. 1A, the system includes a plurality of subsystems 1 to 5, such as machine tools and/or robots. A workpiece is conveyed by a carrier 7 running along a guide or production line 8 extending from a warehouse 6, which is also a subsystem, to each of these subsystems. The workpiece is received and processed by one of the subsystems, and the processed workpiece is then loaded on the carrier 7 again and conveyed to another subsystem to be further processed. Upon completion of a series of scheduled processing, the workpiece is finally delivered from the system.

Figure 1B:
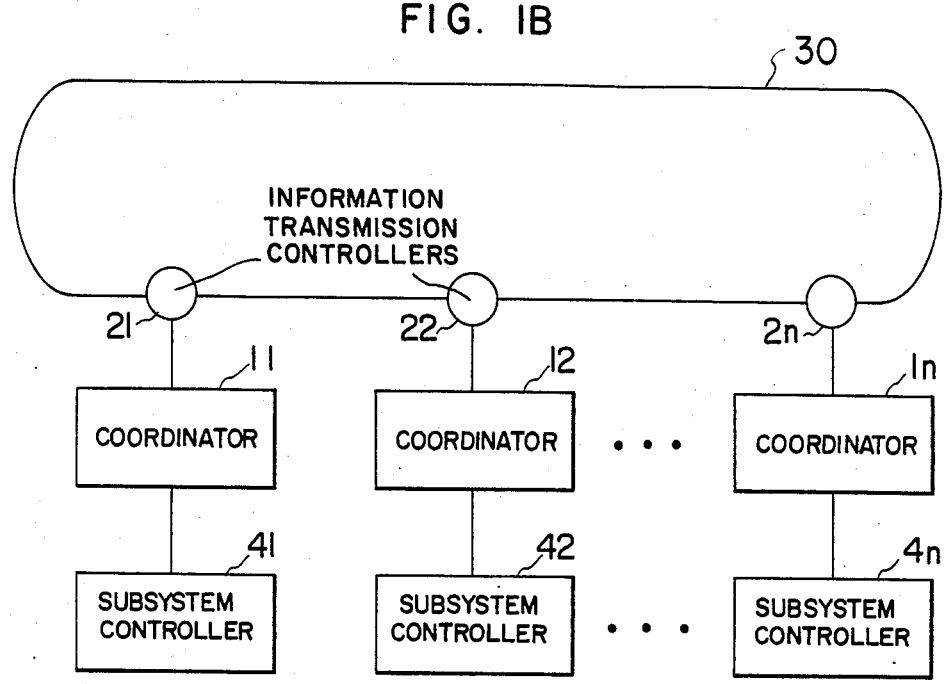
FIG. 1B is a block diagram showing in more detail the communication arrangement of the system of FIG. 1A.

Suppose that a plurality of workpieces are conveyed to these subsystems, and some of these subsystems are capable of carrying out the same function. Then, which one of the subsystems 1 to 5 should process one of the workpieces according to what order or sequence becomes a problem. In order to solve this problem, coordinators 11 to 1n are provided according to the present invention. As shown in FIG. 1B, these coordinators 11 to 1n are interconnected through associated information transmission controllers 21 to 2n and an information transmission loop 30 for exchange of information therebetween. These coordinators 11 to 1n are also connected to associated subsystem controllers 41 to 4n, respectively.

FIG. 2 shows the internal structure of a preferred form of the coordinator 11. Referring to FIG. 2, the coordinator 11 includes an interface 52 connected to the information transmission controller 21, an interface 53 connected to the subsystem controller 41, a processor 51, an input/output buffer 54, file memories 55 to 58, and three kinds of timers 59 to 61.

FIGS. 3a to 3g are flow charts of the steps of processing by the processor 51 shown in FIG. 2, and FIGS. 4 to 7 illustrate the operation of the coordinator 11 shown in FIG. 2.

The operation of the coordinator 11 shown in FIG. 2 will be described in detail with reference to FIGS. 3a to 3g and FIGS. 4 to 7.

The subsystems, which are conventional machine tools and/or robots, are designated by the reference numerals 1 to 5, and the subsystem which is the warehouse is designated by the reference numeral 6 herein. Since the subsystems are of the type well-known in the art and are not necessary for an understanding of the present invention, detailed description thereof has been omitted.

When the power sources for the individual subsystems 1 to 6 are turned on, the subsystem controllers 41 to 4n shown in FIG. 1B transmit data indicative of the identity of the executable functions of the machine tools and/or robots of respective subsystems i connected thereto, to the coordinators 11 to 1n respectively. The coordinator 11 stores the data transmitted from the controller 41 in the input/output buffer 54 (block 71 in FIG. 3a). When the data is indicative of functions executable by the associated subsystem i, the data is then stored in the executable function register file 55 provided in the coordinator 11 shown in FIG. 2 (block 72 in FIG. 3a). It is supposed, for example, that the subsystems 1 and 2 are the same machine tools and both are capable of the same executable functions $F_1$ and $F_4$ as shown in FIG. 4. It is also supposed that executable functions of the subsystem 3 are $F_2$ and $F_7$, those of the subsystem 4 are $F_3$ and $F_9$, and those of the subsystem 5 are $F_5$, $F_6$ and $F_8$ as also shown in FIG. 4.

Suppose now that workpieces $P_1$ and $P_2$ are conveyed along the production line from the subsystem 6, which is the warehouse. Then, as shown in FIG. 5, the process flow data for processing the workpieces $P_1$ and $P_2$ is broadcast on the transmission loop 30 through the information transmission controller 26, shown in FIG. 1A.

Figure 5:
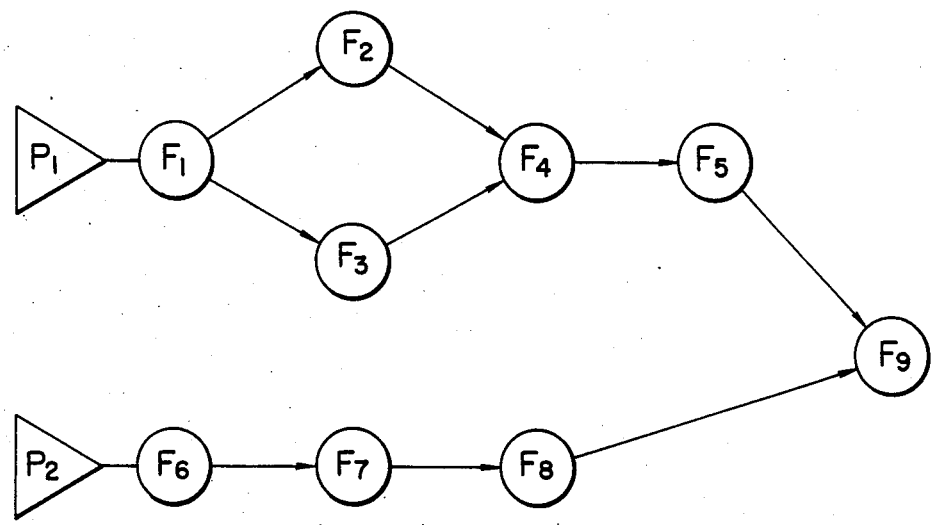

The process flow shown in FIG. 5 indicates the procedure for working. For example, after execution of the function $F_1$ on the workpiece $P_1$, the function $F_2$ or $F_3$ can be executed, and, after execution of the function $F_2$ or $F_3$, the function $F_4$ can be executed on the workpiece $P_1$. On the other hand, the functions $F_6$, $F_7$ and $F_8$ can be executed on the workpiece $P_2$ in a relation entirely independent of execution of the functions $F_1$, $F_2$, $F_3$, $F_4$ and $F_5$ on the workpiece $P_1$. After execution of the functions $F_5$ and $F_8$ in the manner above described, the function $F_9$ is executed on both of the workpieces $P_1$ and $P_2$ to complete all the operations on the workpieces $P_1$ and $P_2$.

In the manner above described, the process flow data for processing the workpieces $P_1$ and $P_2$ is applied to the coordinator 11 (as well as all other coordinators) through the information transmission loop 30 and information transmission controller 21 shown in FIG. 1A. In the coordinator 11, the received data is stored at first in the input/output buffer 54 shown in FIG. 2 (block 73 in FIG. 3b).

Figure 3A:
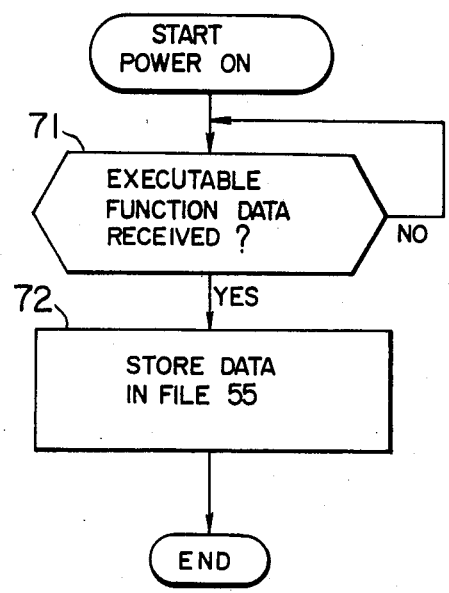
Figure 3B:
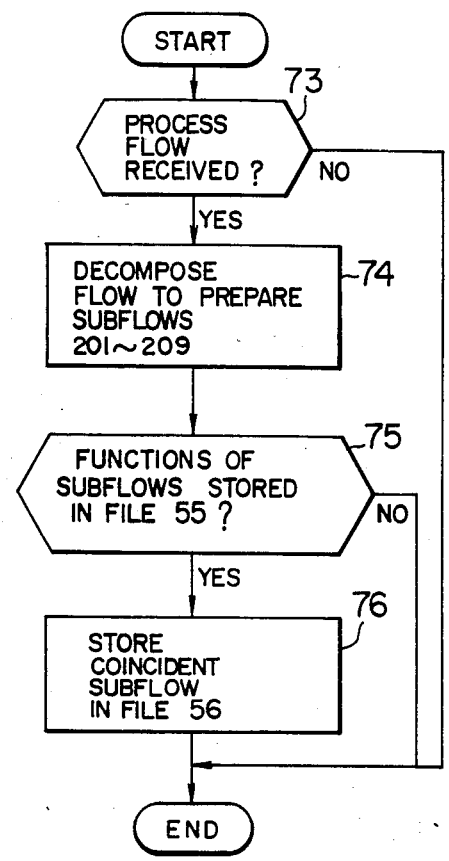
Figure 6:
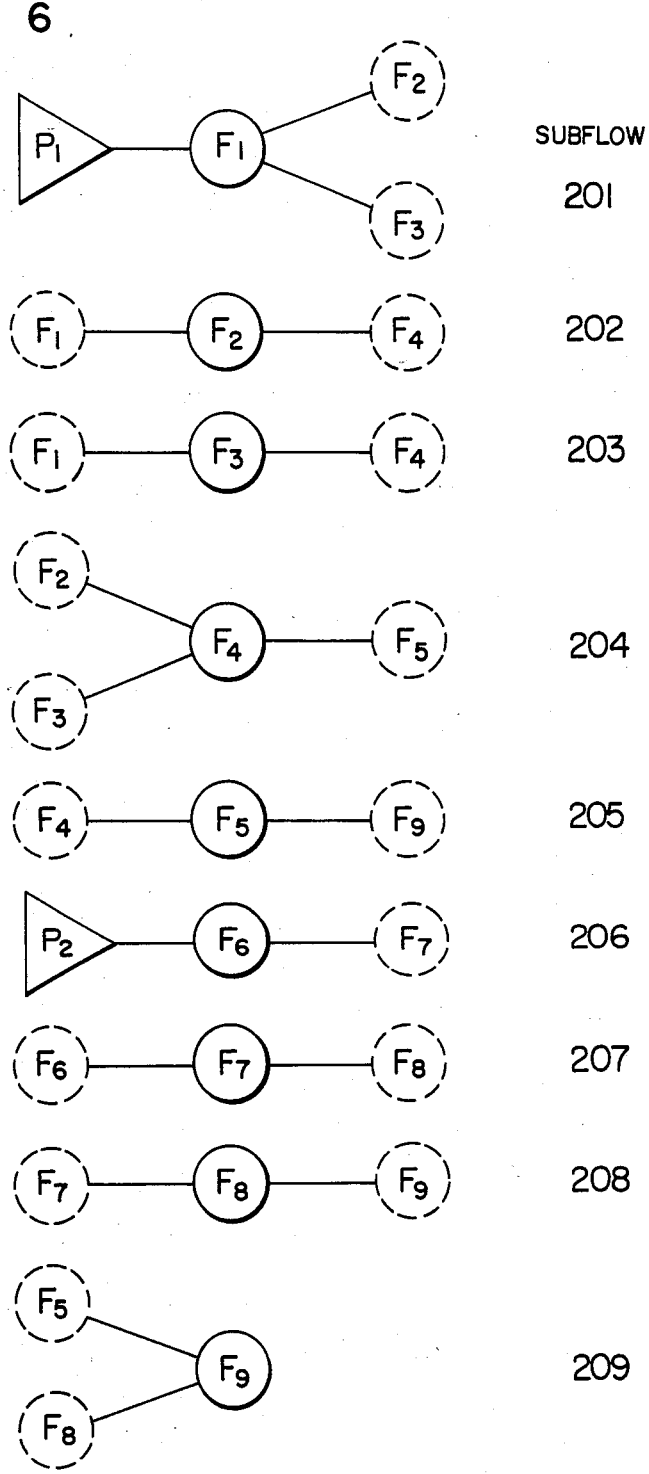

The processor 51 decomposes the process flow data stored in the input/output buffer 54 into the individual processing functions and adds the processing functions of the processes forward and backward of each individual process thereto, thereby making up subflows 201 to 209 as shown in FIG. 6 (block 74 in FIG. 3b). When any one or more of the subflows 201 to 209 indicating the flows of the individual processing functions coincide with those registered in the executable function register file 55 in the coordinator 11 (block 75 in FIG. 3b), those subflows are stored in the processing procedure store file 56 in FIG. 2 (block 76 in FIG. 3b). For example, the processing procedure store files 56 for the subsystems 1 to 5 of FIG. 1A are as shown in FIG. 7. Each of the processing procedure store files stores the data of a workpiece or workpieces to be processed by the corresponding subsystem, the processing functions of that subsystem (the function executed in each of its own processes), and the functions executed in the processes forward and backward thereof.

Figure 3C:
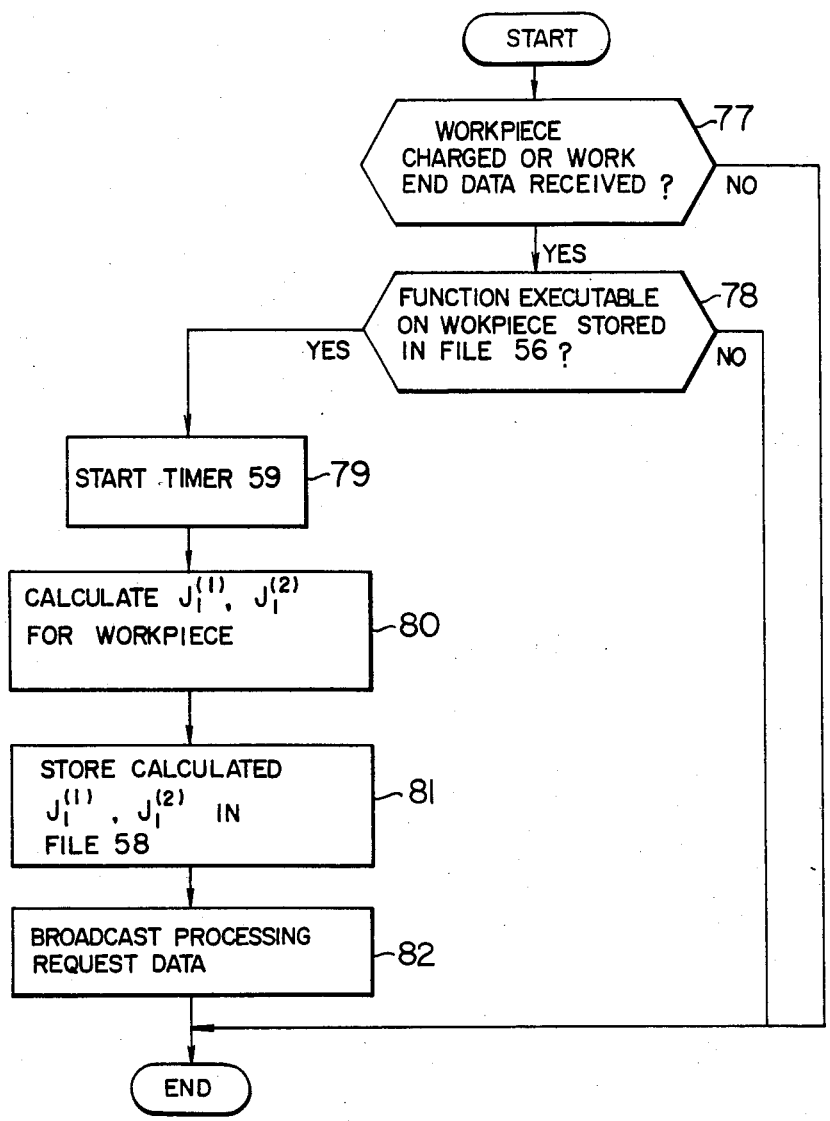

When a new workpiece is conveyed into the production line or completion of a forward process is broadcast through the information transmission loop 30 (block 77 in FIG. 3c), each of the coordinators 11 to 16 searches its processing procedure store file 56 to determine whether or not the associated subsystem can process the workpiece and its own functions can be executed (block 78 in FIG. 3c). For example, when the coordinator 11 having made the above determination finds that the associated subsystem 1 can execute the function $F_1$ on the workpiece $P_1$, the timer 59 is started (block 79 in FIG. 3c), and the performance indices $J_1^{(1)}$ and $J_1^{(2)}$ at that time are calculated according to the algorithm stored in the file 57 storing the rule of coordination (block 80 in FIG. 3c). It is supposed herein that all of the coordinators 11 to 16 store the same coordination rule.

The performance index $J_1^{(1)}$ is, for example, expressed as follows:

$$J_1^{(1)} = T_{1A} + \max\{(T_{1B}+T_{1D}), T_{1C}\}$$

where
- $T_{1A}$: processing time required for execution of function $F_1$ on workpiece $P_1$ to be newly processed,
- $T_{1B}$: time required until completion processing of workpiece $P_3$ now being processed,
- $T_{1C}$: time required for preparation (scheduling) until execution of function $F_1$,
- $T_{1d}$: time required until conveyance of workpiece $P_1$ to subsystem 1 after completion of processing in forward process.

Also, the performance index $J_1^{(2)}$ is expressed as follows:

$$J_1^{(2)} = \max\{(T_{1B}+T_{1D}), T_{1C}\}$$

As a result, the performance indices $J_1^{(1)}$ and $J_1^{(2)}$ specified above are stored in the coordination process record file 58 together with the data of the workpiece $P_1$ and executable function $F_1$ (block 81 in FIG. 3c). Then, the data of $P_1$, $F_1$, $J_1^{(1)}$ and $J_1^{(2)}$ are broadcast on the information transmission loop 30 (block 82 in FIG. 3c).

Similarly, when each of the remaining coordinators finds that the associated subsystem can execute its function on the workpiece, the individual performance indices are calculated to be broadcast on the information transmission loop 30.

Thus, when a new workpiece is supplied to the production line or processing in a forward process is completed, the processing request data $D_i$ is broadcast on the information transmission loop 30 from the coordinator i associated with the subsystem which is now capable of executing its function. This data $D_i$ is given by $$D_i = \{P_j, F_k, J_i^{(1)}, J_i^{(2)}\}$$

where
- $P_j$: workpiece j
- $F_k$: executable function k
- $J_i^{(1)}$, $J_i^{(2)}$: performance indices calculated by coordinator i After reception of the data concerning the supply of the new workpiece or completion of the work in the forward process, the coordinator i actuates the coordination monitoring timer 59. While this timer 59 times a predetermined period of time $T^{(1)}$ (block 83 in FIG. 3d), the coordinator i receives processing request data $D_j$ broadcast from some or all of the other coordinators j ($j \neq i$) (block 84 in FIG. 3d) and stores the data $D_j$ in the coordination process record file 58 (block 85 in FIG. 3d).

Figure 3D:
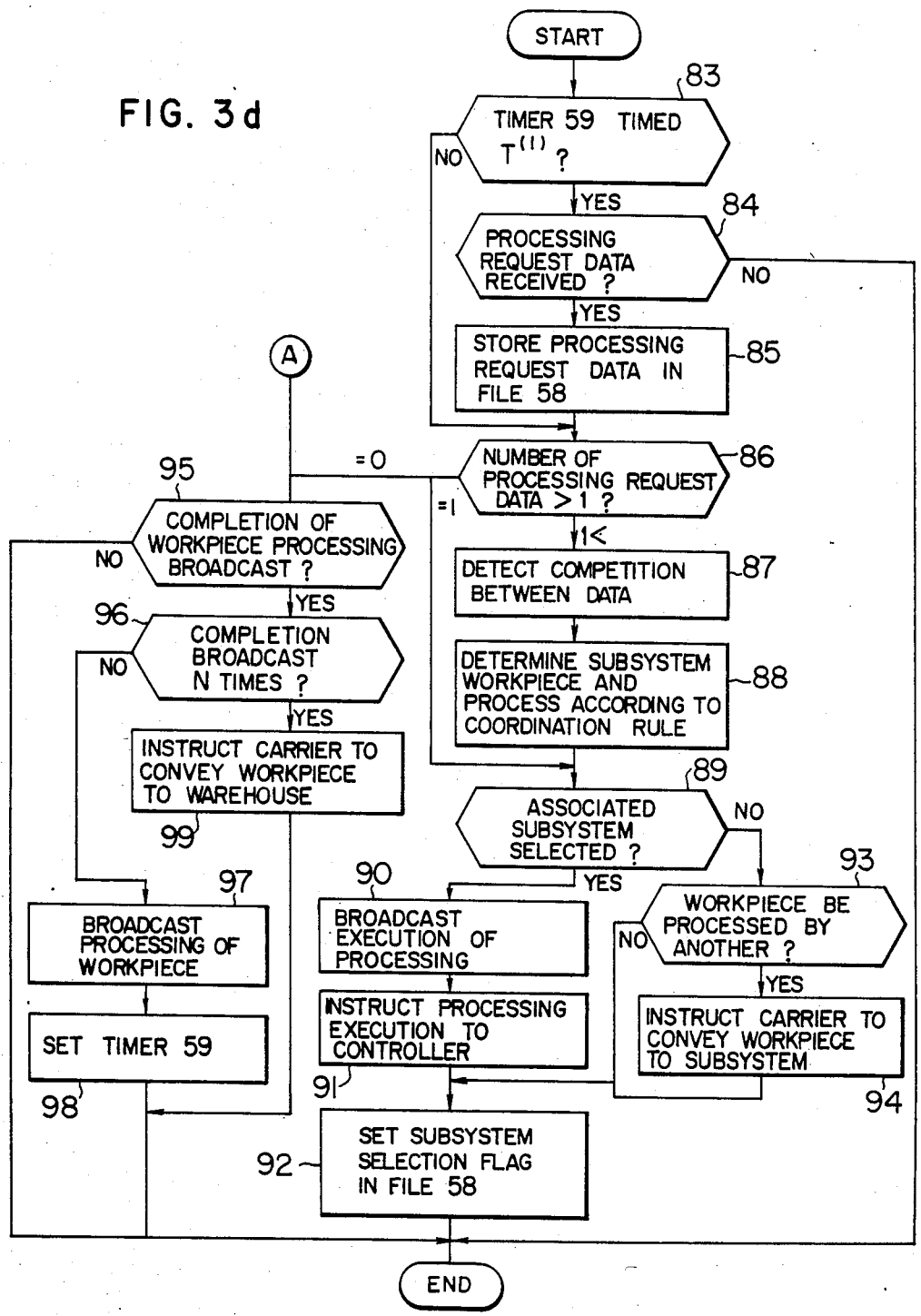
Figures 3G, 4:
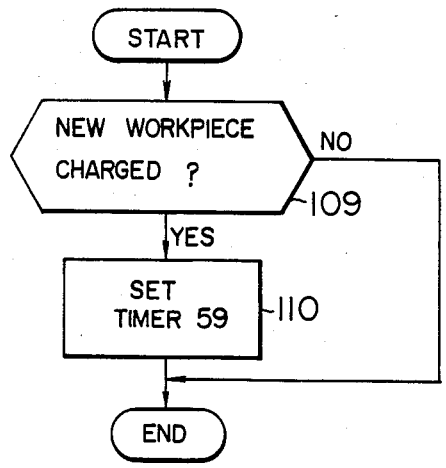

After a plurality of such processing request data $D_j$ are stored in the coordination process record file 58 of the coordinator i (block 86 in FIG. 3d), a suitable one of the coordinators must be selected from among the coordinators having broadcast the request data $D_j$ (blocks 87 and 88 in FIG. 3d). This is because the plural subsystems cannot simultaneously execute processing on the same workpiece. The situation requiring selection of such a suitable subsystem is classified into three cases. In the first case, there are two or more subsystems that can execute the same processing on the same workpiece, and a suitable one of them must be selected. In the second case, there are two or more subsystems that can execute plural functions on the same workpiece in parallel relation, and a suitable one of the functions must be selected as an earlier one. In the third case, there are two or more workpieces, and one of them to be processed earlier than the others by a subsystem to be selected. The method of coordination for these three cases will now be described.

First case:

Suppose that the coordinators 11 and 12 broadcast the processing request data for execution of the same function $F_1$ on the same workpiece $P_1$. Then, these data are respectively as follows:

$$\{P_1, F_1, J_1^{(1)}, J_1^{(2)}\}$$

$$\{P_1, F_1, J_2^{(1)}, J_2^{(2)}\}$$

In such a case, the performance indices $J_1^{(1)}$ and $J_2^{(1)}$ are compared by a processor 51 in each coordinator according to the coordination rule stored in the coordination rule store file 57 so as to select the one which can complete processing on the workpiece $P_1$ within a shorter period of time. When, for example, there is the relation $J_1^{(1)} < J_2^{(1)}$ between the performance indices $J_1^{(1)}$ and $J_2^{(1)}$, the coordinators 11 and 12 determine to select the coordinator 11 for execution of the function $F_1$ on the workpiece $P_1$. If the relation $J_1^{(1)} = J_2^{(1)}$ holds, one of the coordinators 11 and 12 is selected according to a predetermined (fixed) rule. In this manner, a suitable one of the coordinators 11 and 12 can be selected. However, only one of all the coordinators is selected since the coordination rule is common to all of them.

Second case:

Suppose that the subsystems 3 and 4 can execute plural functions such as $F_2$ and $F_3$ in parallel relation on the same workpiece $P_1$. Then, the data broadcast from the coordinators 13 and 14 after completion of the function $F_1$ on the workpiece $P_1$ are respectively as follows:

$$\{P_1, F_2, J_3^{(1)}, J_3^{(2)}\}$$

$$\{P_1, F_3, J_4^{(1)}, J_4^{(2)}\}$$

The two subsystems 3 and 4 carrying out the respective different functions $F_2$ and $F_3$ cannot simultaneously execute the functions $F_2$ and $F_3$ on the same workpiece $P_1$. Therefore, which function $F_2$ or $F_3$ to be executed earlier than the other is determined according to the coordination rule stored in the coordination rule store file 57. In this case, execution of the functions $F_2$ and $F_3$ requires naturally different processing times $T_{3A}$ and $T_{4A}$. Therefore, the performance indices $J_3^{(2)}$ and $J_4^{(2)}$ each representing the period of time required until processing can be started are compared according to the rule so as to select the one which can start processing within a shorter period of time. When, for example, there is the relation $J_3^{(2)} < J_4^{(2)}$ therebetween, the coordinator 13 is selected to execute the function $F_2$ on the workpiece $P_1$ earlier than the function $F_3$. If the relation $J_3^{(2)} = J_4^{(2)}$ holds, one of the coordinators 13 and 14 is selected according to the predetermined (fixed) rule.

As in the first case only a suitable one of the coordinators 13 and 14 is selected, and any other different ones are not selected in this second case too.

Third case:

Suppose that the subsystem 5 can now execute the functions $F_5$ and $F_6$ on the different workpieces $P_1$ and $P_2$ respectively. Then, the coordinator 15 broadcasts the following data after completion of the execution of the function $F_4$ on the workpiece $P_1$ and after charging of the workpiece $P_2$ into the production system respectively:

$$\{P_1, F_5, J_5^{(1)}, J_5^{(2)}\}$$

$$\{P_2, F_6, \overline{J_5^{(1)}}, \overline{J_5^{(2)}}\}$$

Since the subsystem 5 cannot process the workpieces $P_1$ and $P_2$ at the same time, which workpiece $P_1$ or $P_2$ is to be processed earlier than the other is determined according to the rule stored in the coordination rule store file 57. Therefore, the performance indices $J_5^{(2)}$ and $\overline{J_5^{(2)}}$ relating to execution of the functions $F_5$ and $F_6$ on the workpieces $P_1$ and $P_2$, respectively, by the subsystem 5, and each representing the period of time required until processing can be started are compared with each other so as to select the one which can start processing within a shorter period of time. When, for example, there is the relation $J_5^{(2)} < \overline{J_5^{(2)}}$ therebetween, the function $F_5$ is determined to be executed on the workpiece $P_1$ earlier than the function $F_6$ to be executed on the workpiece $P_2$. If the relation $J_5^{(2)} = \overline{J_5^{(2)}}$ holds, one of the workpieces $P_1$ and $P_2$ is selected according to the predetermined (fixed) rule.

As in the first and second cases, only one of the workpieces $P_1$ and $P_2$ is selected according to the algorithm in this third case too.

The coordinator associated with the subsystem determined to execute processing on the workpiece as a result of the steps described above broadcasts execution of the required processing on the workpiece (blocks 89 and 90 in FIG. 3d). On the basis of this broadcast, each of the coordinators is informed of the fact that the specific subsystem executes the specific processing on the workpiece, and a flag indicating determination of the participating subsystem is attached to the processing request data stored in the coordination process record file 58 (blocks 91 and 92 in FIG. 3d). After the specific subsystem has completed the required processing (blocks 101 and 102 in FIG. 3e), the coordinator of that subsystem erases the data of the corresponding contents in the files 56 and 58 and, at the same time, broadcasts completion of the processing (block 103 in FIG. 3e). As a result, each of the coordinators erases the specific processing request data recorded in the coordination process record file 58 (block 104 in FIG. 3e).

The coordinator $i_o$ having broadcast introduction of a new workpiece into the production line (block 109 in FIG. 3g) or completion of processing on the workpiece (block 103 in FIG. 3e) acts to set the coordination monitoring timer 59 so as to monitor whether or not a coordinator participating in later processing is determined (block 105 in FIG. 3e and BLOCK 110 in FIG. 3g). When the coordinator $i_o$ does not receive the data informing the determination of a participating subsystem (block 107 in FIG. 3f) in spite of the fact that the timer 59 has already timed a predetermined period of time $T^{(2)}$ ($T^{(2)} > T^{(1)}$) (block 106 in FIG. 3f), the coordinator $i_o$ decides that the coordinator to be selected is disabled or that no subsystem can execute the next process, where $T^{(1)}$ indicates a maximum time period from the time when the data is transmitted from the subsystem to the time when the subsystem receives the data from each coordinator in a normal procedure. Then, the coordinator $i_o$ broadcasts charging of the new workpiece or completion of the processing again. Thereafter, the same steps as those described above are repeated. When a subsystem which should participate in processing is not determined regardless of repetition of the above steps a predetermined number of times (blocks 95 to 98 in FIG. 3d), the coordinator $i_o$ instructs the carrier to convey the specific workpiece into the warehouse 6 (block 99 in FIG. 3d).

On the other hand, when a subsystem $i_l$ which should participate in processing is determined, the coordinator $i_o$ instructs the carrier to convey the specific workpiece toward the subsystem $i_l$ (blocks 93 and 94 in FIG. 3d).

As described already in the second and third cases, a workpiece P' is determined to be processed later than another as a result of coordination, and a function F' is executed on this workpiece P' after execution of another function. In such a case, the processing request data requesting execution of the function F' on the workpiece are broadcast from the individual coordinators after another function has been executed on this workpiece P'. Coordination processes executed thereafter are the same as those described hereinbefore.

The timers 61 and 60 are included in the coordinator 11 so as to monitor whether or not the coordinator 11 can communicate with the associated information transmission controller 21 and subsystem controller 41 respectively. The coordinator 11 decides that the communication is impossible when the controllers 21 and 41 do not respond to the transmitted data within predetermined periods of time $T_{61}$ and $T_{60}$ respectively. If the coordinator 11 is unable to communicate with these controllers 21 and 41, the files 54, 55, 56 and 58 are cleared.

It will be understood from the foregoing detailed description of the present invention that, in a system including a plurality of distributed subsystems carrying out the same or different functions, the subsystems can individually judge the contents of a process and their own status so that a subsystem which should process the work can be readily identified. Therefore, a suitable processing procedure matching the situation can be readily determined without the necessity for previously scheduling such a work processing procedure. Thus, the system can operate without being shut down and its reliability, expansibility and maintainability can be improved regardless of operational failure of a subsystem, and maintainance or expansion of one of the subsystems.

We claim:

1. In a system including a plurality of distributed subsystems each of which is capable of executing at least one of a plurality of predetermined operations on a given object to be processed by this system, an apparatus for coordinating operations among the distributed subsystems in the form of coordinator means provided for each of said subsystems and connected for communication with the coordinator means of other subsystems through a transmission medium, at least one of said subsystems including means for applying to said transmission medium through its coordinator means information relating to one or more operations to be executed on a given object, and at least each coordinator means connected to a subsystem other than said one subsystem comprising:

memory means for storing information regarding the operations which are executable by the associated subsystem and a predetermined rule for coordination of the operations of said subsystems;

means for judging whether an operation to be next executed on an object to be processed is included in said information regarding executable operations stored in said memory means;

means for determining, when the operation to be next executed on the object is included in said stored information regarding executable works, at least one performance index indicative of a parametric condition required for the associated subsystem to execute said operation on said object based on the present operating status of said associated subsystem; and means for deciding whether said associated subsystem should execute said operation on said object based on the determined performance index determined by that and other coordinator means and said rule stored in said memory means.

2. An apparatus according to claim 1, further comprising means for broadcasting the result of decision by said deciding means to the coordinator means or other subsystems.

3. In a system including a plurality of distributed subsystems which are connected for communication with each other through a transmission medium and each of which is capable of executing at least one of a plurality of predetermined operations on an object to be processed, a method for coordination of operations among the distributed subsystems, comprising the steps of:

applying to said transmission medium information relating to one or more operations to be executed on a given object;

judging, in each of said subsystems, whether an operation to be next executed on a given object is executable by that subsystem;

determining, in each of those subsystems in which the result of said judging is affirmative, at least one value of predetermined performance index indicative of a parametric condition required for that subsystem to execute the operation to be next executed on said given object based on a present operating status of that subsystem and transmitting said determined value of the performance index on said transmission medium; and deciding, in each of said those subsystems, according to a predetermined rule whether that subsystem should execute said work on said object, based on said value of performance index determined therein and the values of the performance index received from other subsystems on said transmission medium.

4. A method of claim 3, wherein the step of deciding whether that subsystem should execute said work on said object is carried out by comparing in the subsystem the value of the performance index determined by that subsystem with the values of the performance index determined by another one of said subsystems.

5. A method of claim 3, further comprising the steps of:

broadcasting, in the subsystem which has decided to execute said operation on said workpiece, the result of the decision to the other subsystems;

broadcasting, in the subsystem which has decided to execute said work on said workpiece and when the execution of said work has been completed by the subsystem, the results of execution of said work to the other subsystems so that the step of judging can be started again in the coordinator of each subsystem with respect to another operation to be next executed on said workpiece; and monitoring, after broadcasting the results of execution, whether any of the subsystems has decided to execute another operation on said workpiece.

6. A method of claim 3, wherein said parametric condition is the total time required for the subsystem to receive said workpiece and complete execution of said operation on said workpiece.

* * * * *

UNITED STATES PATENT AND TRADEMARK OFFICE
CERTIFICATE OF CORRECTION

PATENT NO. : 4,698,629
DATED : October 6, 1987
INVENTOR(S) : Mori et al

It is certified that error appears in the above—identified patent and that said Letters Patent is hereby corrected as shown below:

On the title page Insert
-- Foreign Application Priority Data

October 22, 1982     Japan     57-184555 --

Signed and Sealed this

Seventh Day of June, 1988

Attest:

DONALD J. QUIGG

*Attesting Officer*    *Commissioner of Patents and Trademarks*